United States Patent [19]

Koch et al.

[11] Patent Number: 5,314,374
[45] Date of Patent: May 24, 1994

[54] APPARATUS FOR REMOVING TENDERS FROM A POULTRY CARCASS

[76] Inventors: Jay Koch, 177 Ocean Shore Dr., Key Largo, Fla. 33037; Andrew C. Estes, 211 Widgeon Rd., Russellville, Ark. 72801

[21] Appl. No.: 76,105
[22] Filed: Jun. 14, 1993
[51] Int. Cl.⁵ ............................................. A22C 21/00
[52] U.S. Cl. ................................... 452/136; 452/149; 452/165
[58] Field of Search ............... 452/136, 135, 127, 128, 452/149, 155, 165, 166, 170

[56] References Cited

U.S. PATENT DOCUMENTS

| | | | |
|---|---|---|---|
| 4,477,942 | 10/1984 | Martin et al. | 17/11 |
| 4,682,386 | 7/1987 | Hazenbroek et al. | 452/136 |
| 4,688,297 | 8/1987 | Bartels | 452/165 |
| 4,827,570 | 5/1989 | Scheier et al. | 17/46 |
| 4,873,746 | 10/1989 | Scheier et al. | 17/11 |
| 4,937,918 | 6/1990 | Martin | 452/135 |
| 4,993,114 | 2/1991 | Meyers et al. | 452/136 |
| 5,071,388 | 12/1991 | Lindert et al. | 452/170 |
| 5,098,337 | 3/1992 | Landt et al. | 452/136 |
| 5,269,722 | 12/1993 | Diesing et al. | 452/136 |

Primary Examiner—Willis Little
Attorney, Agent, or Firm—Ray F. Cox, Jr.

[57] ABSTRACT

The present invention is an approved apparatus for the removal of tenders from poultry carcasses. The apparatus of the present invention is used in conjunction with a conveyor having mandrels for receiving and supporting the eviscerated poultry carcass in the proper position for the removal of the tenders. A series of knives and plows partially separate the tender from the poultry carcass. The improved apparatus of the present invention employs fully automated gripping elements which are positioned so as to grip the partially severed tender and to remove the partially severed tender from the poultry carcass by tearing away the remaining connections. The gripper then releases the separated tender onto an auxiliary conveyor. The operation of the gripper mechanism depends on a timing sequence which is initiated by a trigger located on one or both grippers. The motions of the gripper are initiated by contact of the triggers with the shoulder bone of the poultry carcass.

3 Claims, 3 Drawing Sheets

APPARATUS FOR REMOVING TENDERS FROM A POULTRY CARCASS

BACKGROUND OF THE INVENTION

The present invention relates to an apparatus for removing tenders from the sides of the keelbone of a poultry carcass carried along a conveyor by a mandrel.

The tender is a portion of flesh lying along the keelbone and ribs of a poultry carcass. There has recently been an increased demand for an apparatus which can efficiently remove tenders from a poultry carcass. Due to the position of the tender on the poultry carcass, efficient removal of the tender has presented problems which have been difficult to solve in the context of an entirely automated mechanical apparatus. As a result, the prior art mechanisms have suffered from inefficient removal of the tender from the poultry carcass and the removal must be accomplished at least partly by manual labor with associated costs and other inefficiencies.

U.S. Pat. Nos. 4,873,746 and 4,827,570 disclose an apparatus for removing poultry tenders that includes two sets of peeling fingers and a pair of wiper elements which cooperate to peel the tenders away from the keelbone. In another embodiment, a pair of knives are used to initiate the separation process.

U.S. Pat. No. 4,477,942 discloses several variant methods of removing the tenders by manual means. Manual removal of the tenders has the advantage of efficiently removing all of the tender from the poultry carcass. The use of scraping or wiping elements to remove the tender is inconsistent in its efficient removal of all of the tender from the poultry carcass.

There is, therefore, a need for apparatus for removing tenders from a poultry carcass which combine the advantages of automation with efficient removal of the tenders from the poultry carcass while avoiding the use of manual labor.

SUMMARY OF THE INVENTION

The present invention is an improved apparatus for the removal of tenders from poultry carcasses. The apparatus of the present invention is used in conjunction with a conveyor having mandrels for receiving and supporting the eviscerated poultry carcass in the proper position for removal of the tenders. A series of knives and plows partially separate the tender from the keelbone of the poultry carcass. At this point in the process the prior art relies on either wiping or scraping elements in the fully automated version or on manually tearing away the partially severed tender from the poultry carcass.

By contrast the improved apparatus of the present invention employs fully automated gripping elements which are positioned so as to grip the partially severed tender automatically and to remove the partially severed tender from the poultry carcass by tearing away the remaining connections. The gripper then releases the separated tender onto an auxiliary conveyor.

The operation of the gripper mechanism depends on a timing sequence which is initiated by a trigger located on one or both grippers. The sequence of timing of the motions of the gripper and the opening and closing of the gripper on the tender are initiated by contact of one or more triggers with the shoulder bone of the poultry carcass. Therefore, in operation the process is carried forward with a high degree of efficiency which is not dependent on the absence of a poultry carcass from a particular mandrel as it passes the tender removal position.

DETAILED DESCRIPTION OF THE PREFERRED EMBODIMENTS

Figure 1:
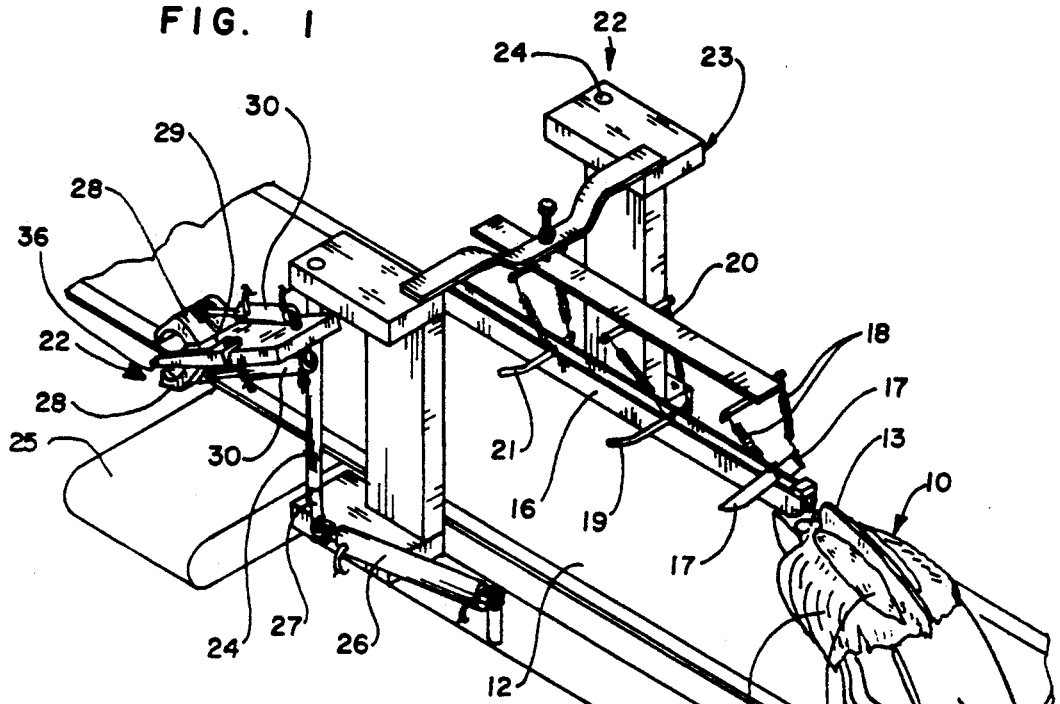
FIG. 1 is a perspective view of the present invention showing a poultry carcass in position on a mandrel on the conveyor as it approaches the pair of knives.

Referring to FIG. 1 a poultry carcass 10 is shown in position on the mandrel 11 of the mandrel conveyor 12. Mandrel conveyors 12 are known in the art.

In order for the present invention to function properly, it is important that the poultry carcass lo be placed upon the mandrel 11 in the proper position. The keelbone 13 is placed uppermost and aligned longitudinally with the direction of motion of the mandrel conveyor 12. By the time the poultry carcass 10 has reached this point in the processing machinery, the carcass 10 has been eviscerated and most of the flesh removed from the carcass 10 including the wings and breast meat. The tenders 14 remain on the carcass. The tenders 14 lie along the keelbone 13 and partially on the ribs 15 of the poultry carcass 10. As the mandrel conveyor 12 advances the poultry carcass 10 into the mechanism, the keelbone 13 is received and guided by the keelbone guide 16. A pair of knives 17 are disposed on the keelbone guide 16 and resiliently biased by springs 18. As the poultry carcass 10 advances along the keelbone guide 16, the knives 17 make incisions along the sides and under the tenders 14 which initiates the separation of the tenders 14 from the carcass 10. As the mandrel conveyor 12 continues to advance the poultry carcass 10 along the keelbone guide 16, the poultry carcass 10 next encounters a pair of plows 19. As with the knives 17, the plows 19 are attached to the keelbone guide 16 and resiliently biased by a pair of springs 20. The plows 19 pressing against the carcass 10 and along the sides of the tenders 14, push against and under the tenders 14 further separating each tender 14 from its attachment to the carcass 10. A single set of plows 19 may be sufficient to effect adequate separation of the tenders 14 from the carcass 10. However, if necessary, a second set of plows 21 may provide a further degree of separation. Further, if necessary, the second set of plows 21 may be designed so as to effect a deeper penetration between the carcass 10 and the tender 14 or may be designed to effect a wider separation of the tender 14 from the carcass 10.

Figure 4:
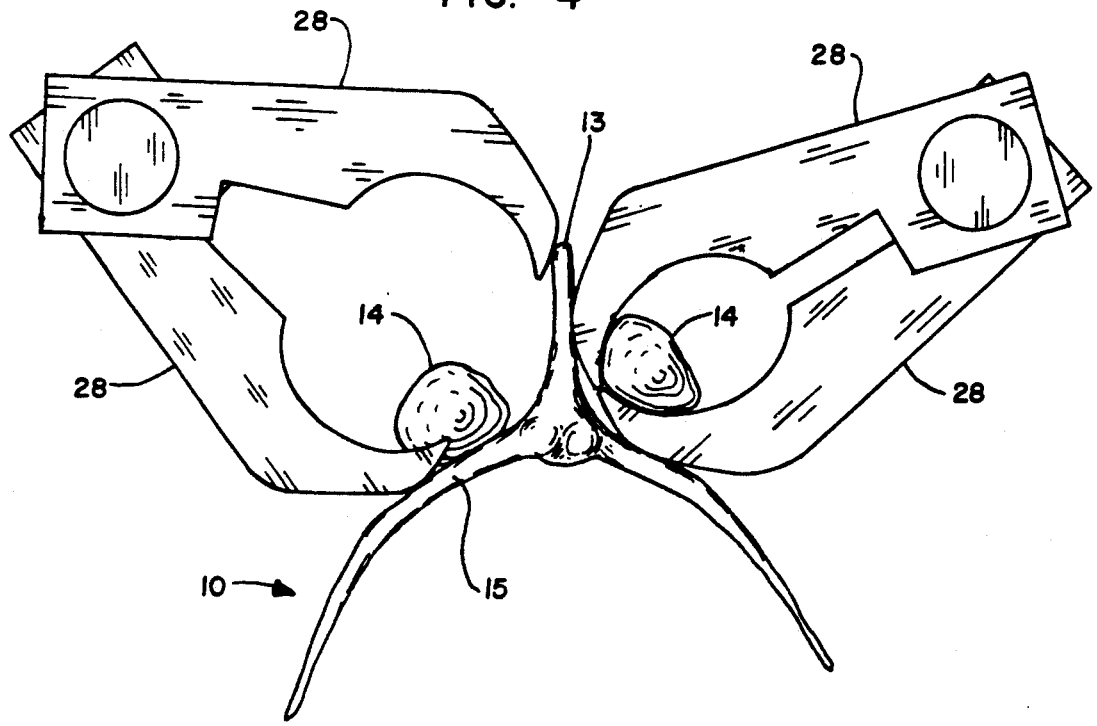
FIG. 4 is a fragmentary sectional view of the poultry carcass in position for the gripper jaws to close around the respective tenders. One pair of gripper jaws is shown in the open position, the second pair is shown in the closed position.

After passage of the poultry carcass 10 through the knives 17, the first set of plows 19 and the second set of plows 21 the tender 14 has been essentially completely separated from the carcass 10. With reference to FIG. 4, it may be seen that the tender 14 remains attached only to a portion of the rib cage 15.

Figure 3:
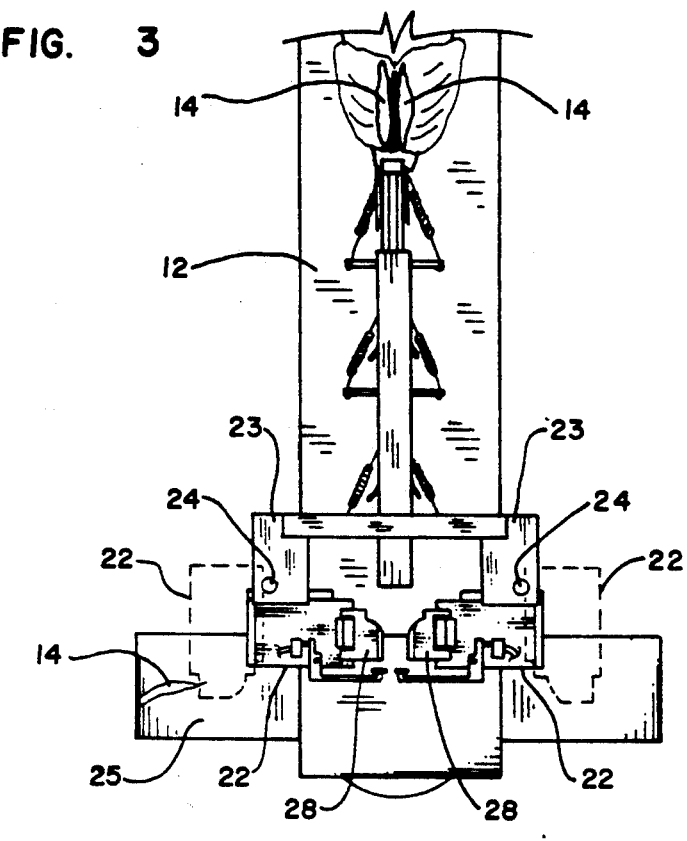
FIG. 3 is a plan view of the present invention showing the mandrel conveyor, the auxiliary conveyor for receiving the separated tenders and the pair of gripper assemblies in position to receive the tender from the poultry carcass and further showing the alternative position of each of the gripper assemblies for releasing the separated tender onto the auxiliary conveyor.

As may be seen with reference to FIG. 3, the pair of tenders 14 lie in longitudinal alignment with reference to the motion of the mandrel conveyor 12.

Again with reference to FIG. 1, the final stage of removal of the tenders 14 may be described. A pair of gripper assemblies 22 are disposed one to either side of the mandrel conveyor 12. The design of the gripper assemblies 22 are substantially identical. The gripper assemblies 22 are supported in a vertical position by means of support assemblies 23. The gripper assemblies 22 comprise a vertical axle 24 which is held in a vertical position by the support assemblies 23 and which allows rotation of the gripper assembly 22 about the vertical axle 24. The gripper assemblies 22 are therefore able to move from a first position as shown on FIG. 3 in which the gripper assemblies 22 are disposed toward the mandrel conveyor 12 so as to intercept the poultry carcass 10 as it advances along the mandrel conveyor 12. The gripper assemblies 22 are rotatable into a second position as shown by the phantom lines on FIG. 3 in which the gripper assembly 22 is disposed away from the mandrel conveyor 12 and toward a transversely mounted auxiliary conveyor 25. The auxiliary conveyor 25 is disposed under the mandrel conveyor 12.

Again with reference to FIG. 1, the gripper assembly 22 is movable between the first position and the second position by means of an actuator 26. The actuator 26 pushes against a lever arm 27 attached to the vertical axle 24. The actuator 26 may be any of a number of types well known in the art. While the actuator 26 may be electrically operated or hydraulically operated, in the preferred embodiment the actuator 26 is air operated.

Each of the gripper assemblies 22 further comprises a pair of jaws 28 pivotally mounted to a support platform 29 which in turn is rigidly affixed to a vertical axle 24.

Each jaw 28 is further equipped with actuators 30 which are able to cause each of the jaws 28 to open or close with respect to its complementary member. With respect to FIG. 4, a pair of jaws 28 is shown in the open position and a second pair of jaws 28 is shown in the closed position.

Figure 2:
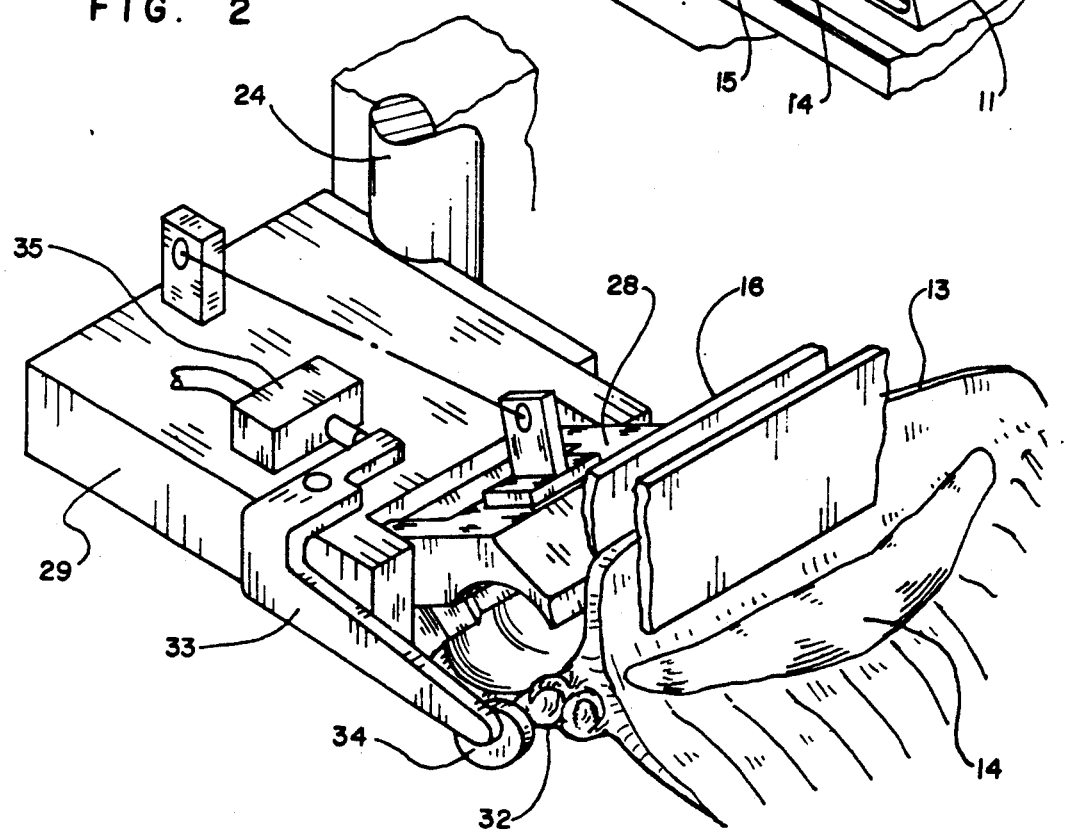
FIG. 2 is a fragmentary perspective view of one of the gripper assemblies showing the poultry carcass approaching the trigger which initiates the closing of the gripper jaws for separation of tender from the keelbone of the poultry carcass.
Figure 5:
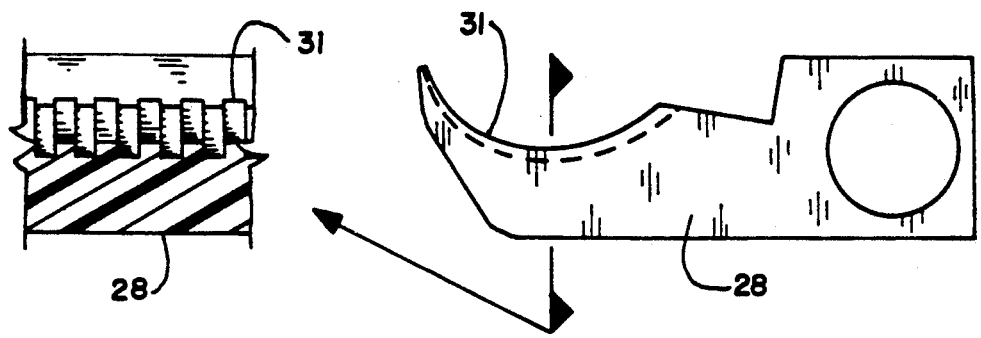
FIG. 5 is a view of one of the gripper jaws.

The complete operation of the gripper assemblies 22 may now be described. The gripper assemblies initially begin in the first position as described above wherein the jaws 28 of each respective gripper assembly 22 is found in the open position. The jaws 28 are so positioned and disposed that as the poultry carcass 10 advances along the mandrel conveyor 12, the partially severed tenders 14 pass into and between the jaws 28 in the open position. This is illustrated in FIGS. 2 and 4. Once the poultry carcass 10 is in the correct position as described more fully below, the jaws 28 on each side of the keelbone 13 close about the partially severed tender 14. In addition to the positioning of the jaws 28 relative to the partially severed tender 14, the shape of the jaws 28 are also significant to the efficient gripping and removal of the tender 14. As shown in FIG. 5, the inner profile 31 of each jaw 28 is a semi-ellipse with its long axis extending along the major dimension of the jaw 28.

This particular contour has been found to be efficient in grasping and severing the tender 14 with the greatest efficiency. In the preferred embodiment, the jaws 28 are also provided with longitudinal grooves along the inner profile 31 so as to provide increased gripping power.

While the jaws 28 upon assuming the closed position may act to partly sever the tender 14 from the rib cage 15 of the poultry carcass 10, the jaws 28 do not actually effect the complete separation of the tender 14 from the poultry carcass 10. The remaining separation occurs as the gripper assemblies 22 are rotated by the actuator 26 from the first position adjacent to the poultry carcass 10 to the second position lying over the auxiliary conveyor 25. The motion of the gripper assemblies 22 away from the poultry carcass 10 acts to tear the remaining connections of the tender 14 to the poultry carcass 10. Once the gripper assemblies 22 are in the second position over the auxiliary conveyor 25, the jaws 28 are moved by the actuators 30 to the open position thereby releasing the severed tender 14 onto the auxiliary conveyor 25. The gripper assembly 22 then is returned by the actuator 26 to the first position with the jaws 28 in the open position so as to receive the next poultry carcass 10 as it advances along the mandrel conveyor 12.

The sequencing of the movements of the gripper assembly 22 may be actuated by various mechanisms. For example, the gripper mechanism 22 may be directly driven by the motion of the mandrel conveyor 12. Further mechanisms are possible, such as cams, interrupted light beams, switches or various other possibilities which would be suggested by the prior art. In the preferred embodiment of the present invention, the most effective mechanism has been found to be the use of a trigger activated by the shoulder bone 32 of the poultry carcass 10. As may be seen with reference to FIG. 2, the shoulder bone 32 is exposed at the forward end of the keelbone 13. A trigger 33 is pivotally mounted to the support platform 29 and provided with a contact pad 34 positioned so that it intersects the path of the shoulder bone of the poultry carcass 10 as it is transported along the mandrel conveyor 12. Contact of the shoulder bone 32 with the contact pad 34 of the trigger 33 causes the activation of a switch 35 (designated as LS-1 in the schematic of FIG. 6) which provides an initiating signal to the timing circuitry which is described more fully below. It should be noted that in FIG. 2 the actuators 30 have been deleted for clarity.

Figure 6:
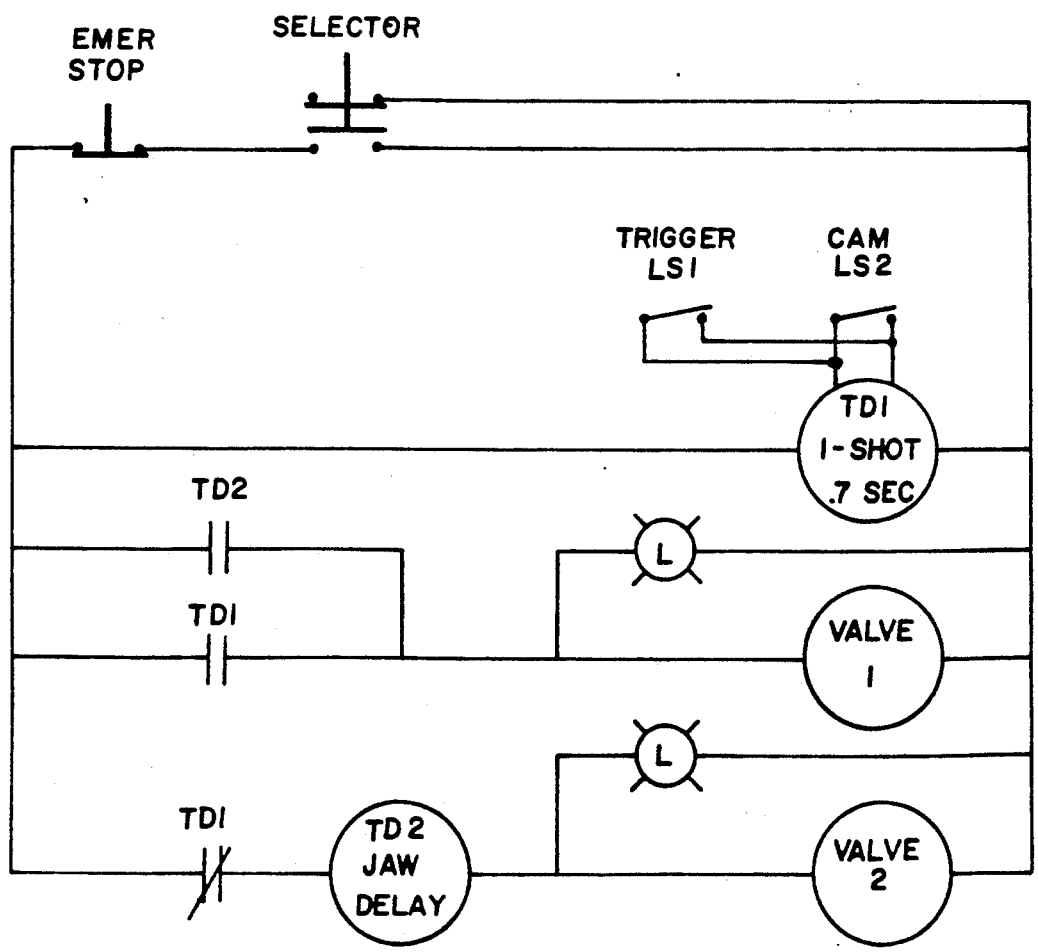
FIG. 6 is a schematic of the timing circuitry.

The timing circuitry is described more fully with reference to FIG. 6. While dual triggers may be employed effectively to provide initiating signals to the timing circuitry, the preferred embodiment employs a left trigger 33 to supply the initiating signal and a right trigger 36 which which applies pressure to the tender 14 to help facilitate removal. Switch LS1 activates an adjustable 0.7 second one-shot time delay TD1. Through TD1 valve 1 is energized causing both sets of jaws 28 to close. Valve 1 activates the actuators 30. Valve 2, which is normally in the energized position, activates actuators 26. By the actions of TD1 valve 2 activates actuator 26 to cause the gripper mechanisms 22 to move to the second position. Having timed out, TD1 deenergizes valve 1 allowing jaws 28 to open and drop the severed tender 14 onto the auxiliary conveyor 25. A second adjustable time delay TD2, delays the signal to valve 1 so as to allow adjusting the time interval that jaws 28 remain in the open position. This timing can allow additional time for the somewhat stickey tender 14 to release and drop from the jaws 28. Valve 2 is than deenergized which allows the gripper assemblies 22 to return to the first position.

In an alternative embodiment, a cam may be used to activate switch LS2 to provide a backup trigger to start the sequence of movements when there is no carcass presented to the gripper assemblies 22. This allows the gripper assemblies 22 to be moved to the second position so as to allow the free passage of the mandrel 11.

While the present invention is described with reference to certain preferred embodiments and alternatives, they are given by way of example and not of limitation to the full scope of the present invention as set forth in the appended claims.

What is claimed is:

1. In combination with an apparatus for butchering poultry carcasses including conveyor means for advancing the poultry carcasses along a path and means associated with the conveyors for positioning the poultry carcasses upright and longitudinally aligned with the path, an apparatus for removing tenders from the sides of the the poultry carcass, comprising:

a pair of knives positioned alongside said path for severing tendons and ligaments which secure the tenders to the poultry carcass;

plow means positioned alongside said path comprising at least one pair of plows for further severing tendons and ligaments which secure the tenders to the poultry carcass and positioning the tenders for removal without completely separating the tenders from the carcass;

gripping means for gripping the tenders and separating the tenders from the carcass; and an auxiliary conveyor for receiving the tenders after separation from the keelbone.

2. The apparatus of claim 1 wherein said gripping means comprises:

a pair of grippers, each of said grippers further comprising a pair of jaws;

means associated with each of said grippers for moving each of said pairs of jaws between an open position and a closed position;

means for moving each of said gripers between a first position alongside said path such that advancement of said poultry carcass along said path positions the partially separated tender within said open position of said respective pairs of jaws and a second position wherein said grippers are positioned above said auxiliary conveyor;

initiating means for sensing the position of the poultry carcass and generating an initiating signal; and timing means responsive to said initiating signal and operatively connected to said means for moving said jaws and said means for moving said grippers for sequentially moving said grippers to said first position with said jaws in said open position, moving said jaws to said closed position about the partially separated tenders, moving said grippers to said second position thereby separating the tenders from the keelbone by tearing, moving said jaws to said open position thereby releasing the separated tenders to said auxiliary conveyor, and returning said grippers to said first position.

3. The apparatus of claim 2 wherein said initiating means comprises at least one trigger positioned so as to intersect the shoulder bone of the poultry carcass as the poultry carcass advances along said path and means to generate said initiating signal upon said trigger contacting said shoulder bone.

* * * * *